Dec. 23, 1958   R. W. GREENE   2,865,510
MULTIPLE STAGE GRAVITY FILTERS
Filed Oct. 22, 1956   5 Sheets-Sheet 1

INVENTOR
Raymond W. Greene
BY Alexander Powell
ATTORNEYS

Dec. 23, 1958  R. W. GREENE  2,865,510
MULTIPLE STAGE GRAVITY FILTERS
Filed Oct. 22, 1956  5 Sheets-Sheet 2

INVENTOR
Raymond W. Greene
BY Alexander Dowell
ATTORNEYS

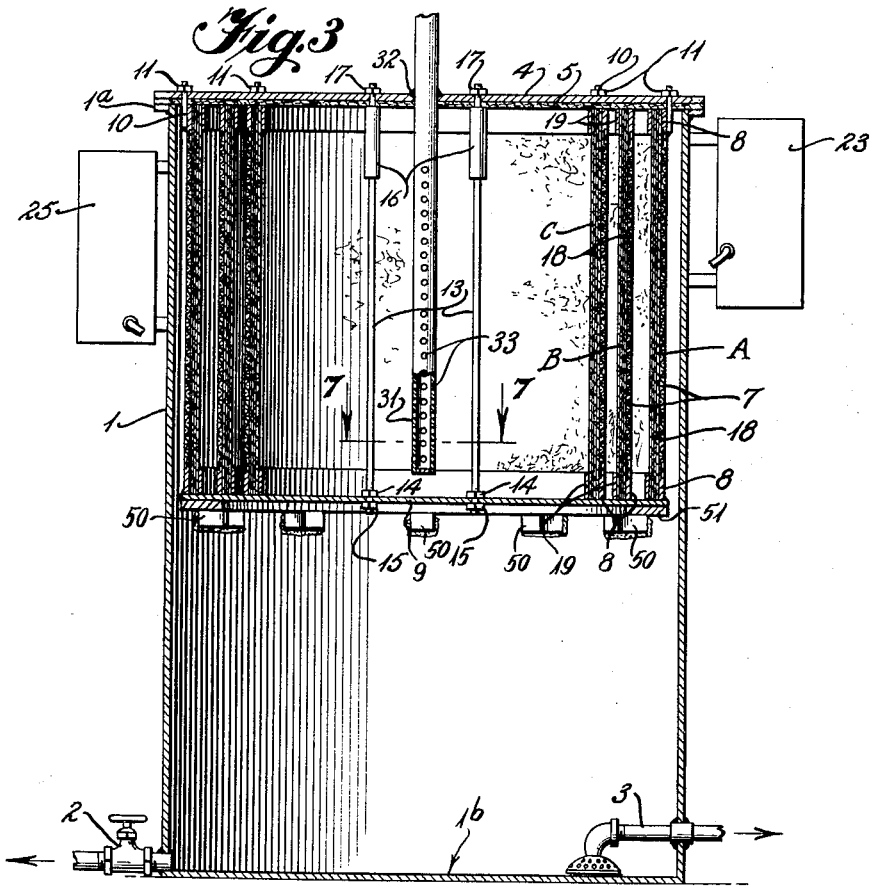
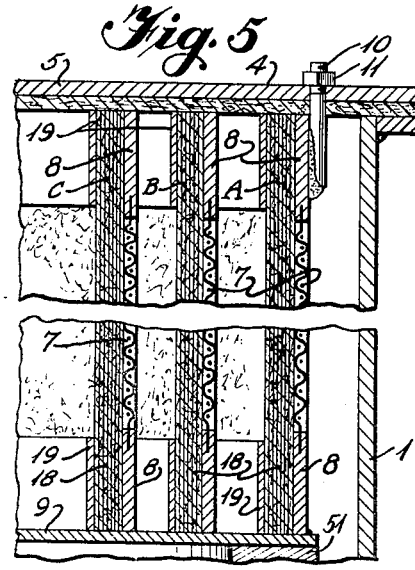
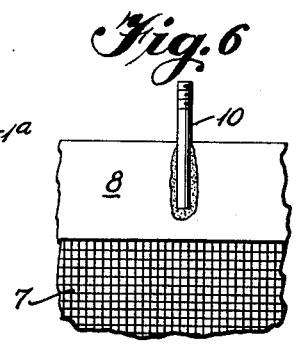
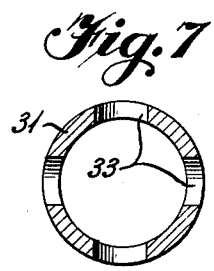
INVENTOR
Raymond W. Greene
BY
ATTORNEYS

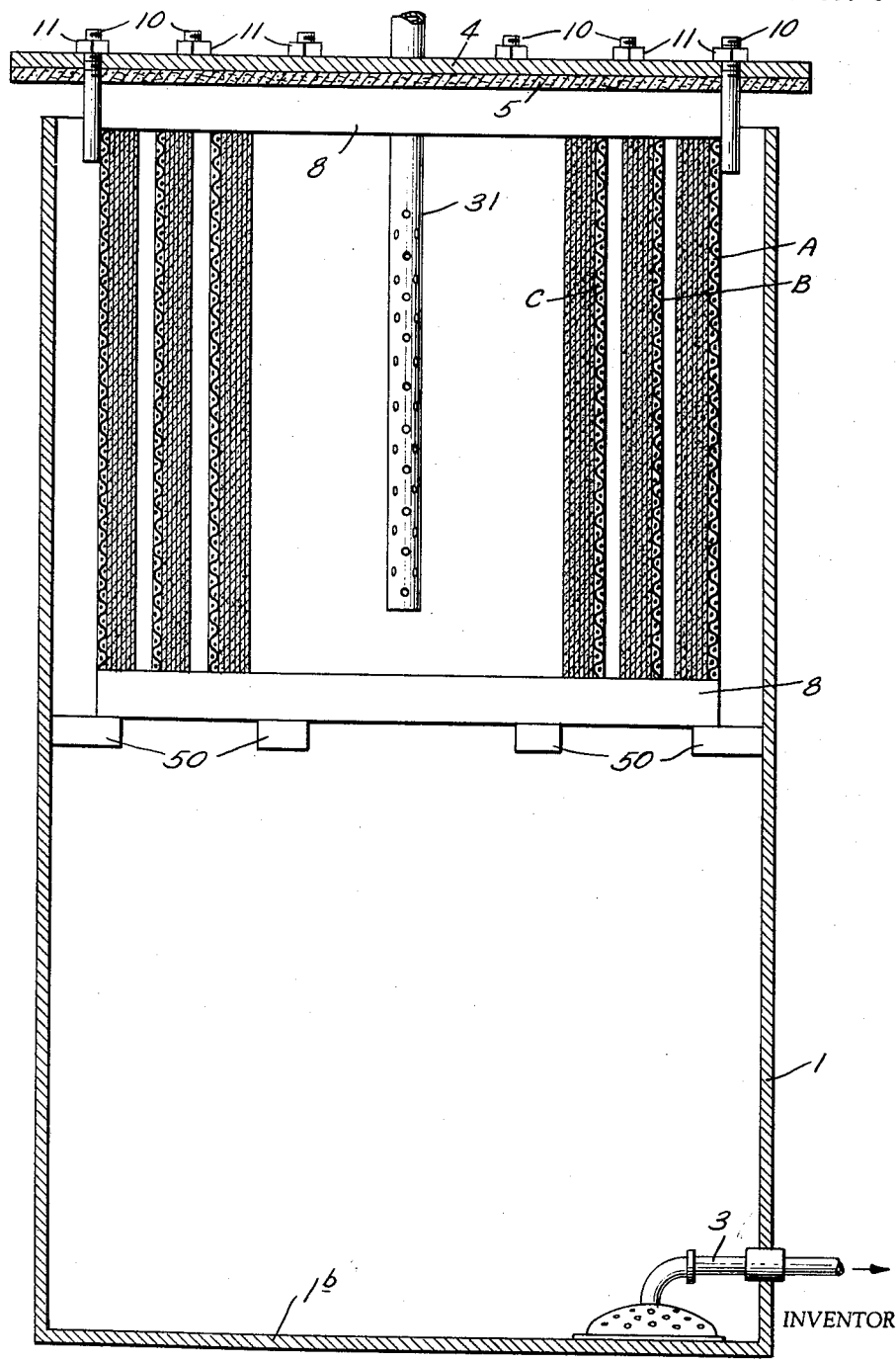

Dec. 23, 1958   R. W. GREENE   2,865,510
MULTIPLE STAGE GRAVITY FILTERS
Filed Oct. 22, 1956   5 Sheets-Sheet 5
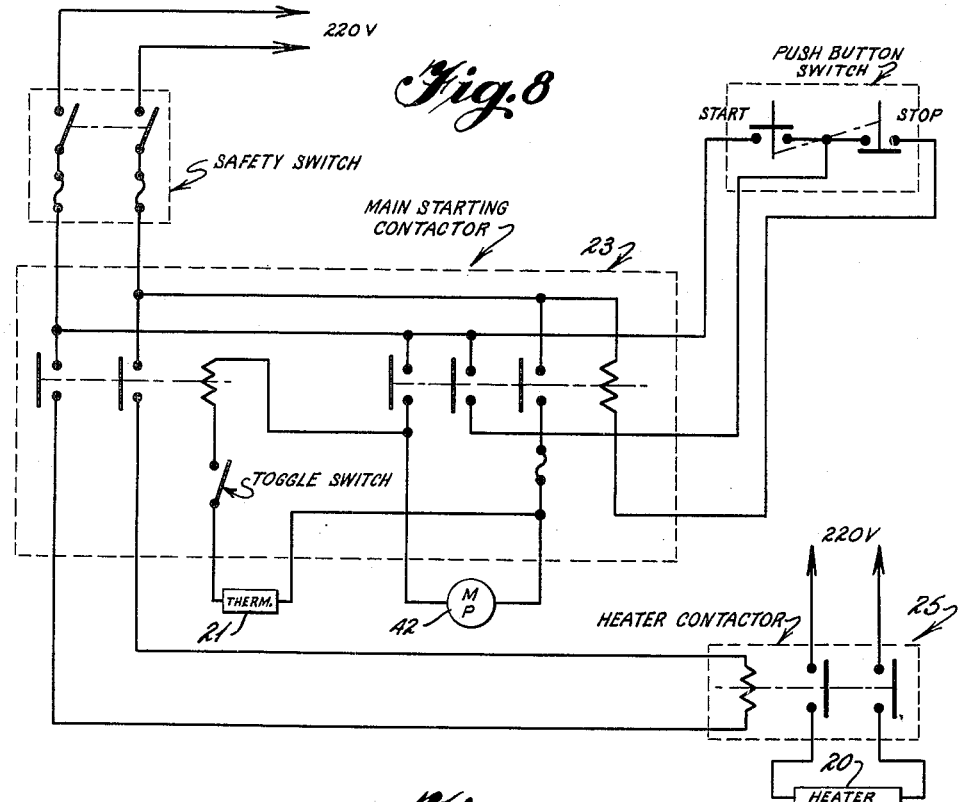
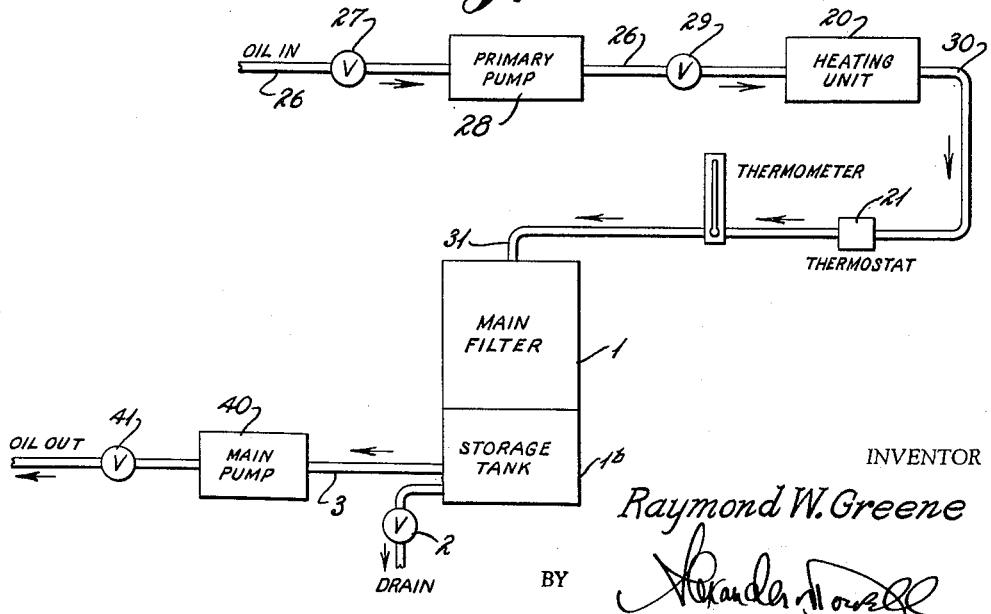
INVENTOR
Raymond W. Greene
BY 
ATTORNEYS

United States Patent Office 2,865,510
Patented Dec. 23, 1958

2,865,510

MULTIPLE STAGE GRAVITY FILTERS

Raymond W. Greene, Hampden, Maine

Application October 22, 1956, Serial No. 617,621

15 Claims. (Cl. 210—315)

My invention is a novel multi-stage gravity filter of novel construction and arrangement adapted to provide a convenient means for effectively filtering any liquid from which it is desired to remove organic material and like impurities, thereby rendering the filtered liquid available for further mechanical use, my filter being especially designed for use in filtering carbon, water, and other impurities from any type of insulating oil, commonly used in the operation of circuit breakers and transformers, thereby permitting the reuse for an indefinite period of the original insulating oil used therein.

It has been found that if at all stages of a filtering process, oil or other liquid is forced by pressure through a filtering medium, fine particles of carbon and other impurities pass through the filter with the result that the filtered liquid is of poor quality and low test.

The principal object of my invention is to provide a filtering process which consists of three or more or less stages during the first of which the liquid to be filtered is pumped under pressure of the full thrust of a pump directly into the smallest or inner drum of the device which is lined with several thicknesses of blotting paper. As the pumping continues the liquid to be filtered passes from the smallest inner drum into the next larger or center drum which is also lined with several thicknesses of blotting paper, and thence passes into the largest or third or outer drum also lined with blotting paper where the liquid, now thoroughly filtered, falls by gravity or flows by its own weight into a receiving container from whence the filtered liquid is pumped back to its original source.

Another object of my invention is to provide a triple-stage filter which triple filters the liquid, pressure being applied only through the first stage of the process, the next two stages being successively fed by gravity flow, so that during the final two stages the pressure is negligible, and any particles of carbon or other impurities which may have passed through the first filter, are caught on the blotting paper used as liners in the second and third stages and are thus prevented from again entering the oil or other liquid being filtered, the carbon and other deposits built up on the blotting paper improving the quality of the filtering medium as more oil is filtered. Tests have shown that as much as 15,000 gallons of oil can be filtered by this device without changing the blotting paper and that the oil so filtered is of excellent quality and high test.

I will explain the invention with reference to the accompanying drawings which illustrate one practical embodiment thereof to enable others familiar with the art to adopt and use the same; and will summarize in the claims, the novel features of construction, and novel combination of parts, for which protection is desired.

In said drawings:

Fig. 3 is a vertical sectional view on the line 3—3, Fig. 2.

Fig. 5 is an enlarged detail section showing the mounting of the drums on the cover of the tank casing.

Fig. 5A is a view similar to Fig. 5 showing a modified mounting of the drums on the cover of the tank casing.

Fig. 6 is a detail elevation.

Fig. 7 is an enlarged section on the line 7—7, Fig. 3.

Fig. 8 shows one wiring diagram for the electrical circuit of the filter.

Fig. 9 shows a flow diagram for the filter.

Figure 1:
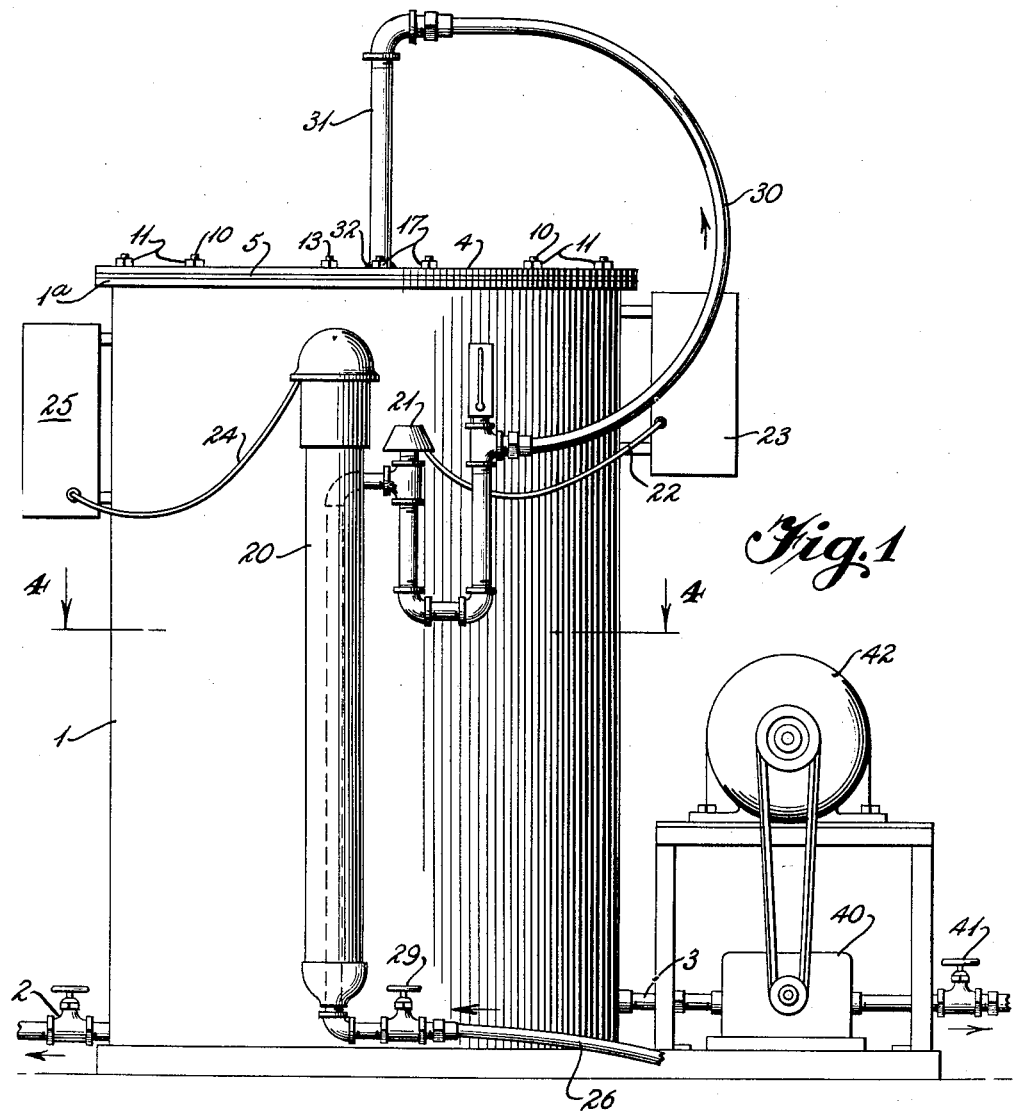
Fig. 1 is a side elevation of my novel multi-stage gravity filter.
Figure 2:
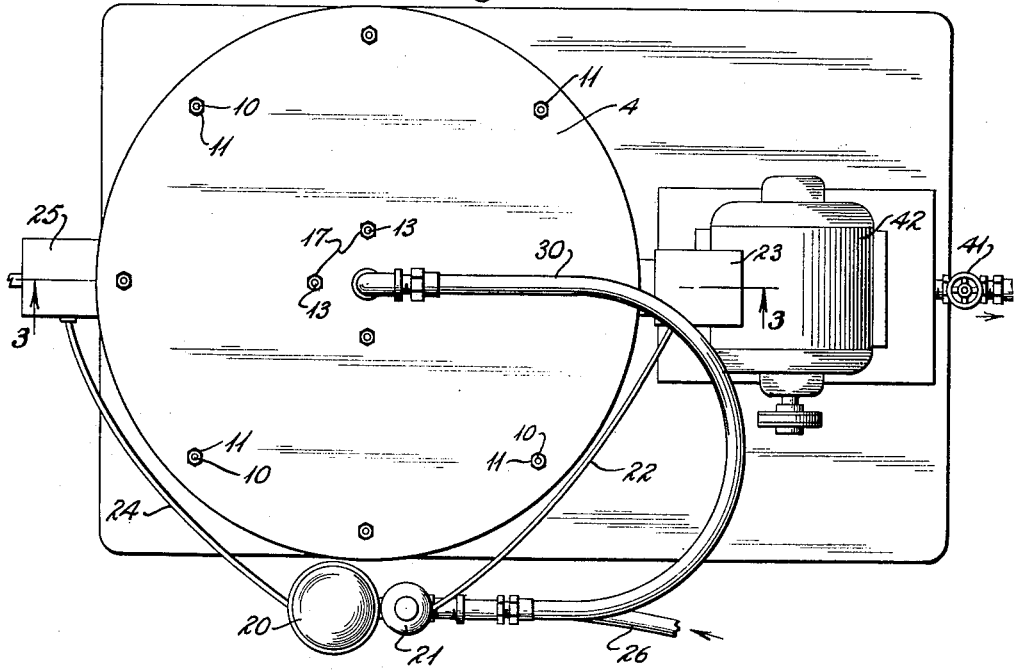
Fig. 2 is a top plan view thereof.

My novel filtering units, hereinafter described, are housed in the upper portion of a circular metallic tank 1, the bottom of which serves as a temporary storage receptacle for the liquid which has passed through the multiple filtering units in the cleansing process. Three such filtering units are shown in Figs. 3 and 5, but obviously the number of units may be varied to a greater or lesser number if desired.

The tank 1 is open at the top but is provided with an upper external peripheral flange 1a, and with a closed bottom 1b; and in the bottom of the tank is a valved drain 2, and a filtered liquid outlet 3.

Figure 4:
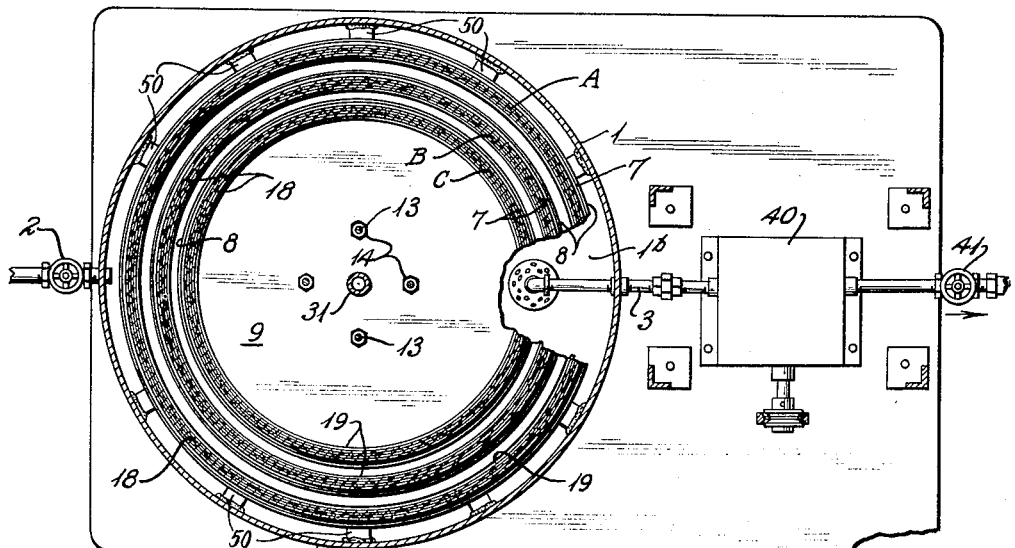
Fig. 4 is a horizontal section on the line 4—4, Fig. 1.

Within the upper portion of tank 1 are nested filtering units A, B, and C (Figs. 3, 4, and 5), the filtering unit A being largest in diameter and spaced from the wall of tank 1, and the filtering units B and C being progressively smaller in diameter so as to leave spaces between the units when positioned in the tank as shown in Figs. 3 and 5. Filtering units A, B and C are of circular shape and of uniform height, and are graduated in diameter as above stated to permit the several units to be placed one within the other with predetermined spacing therebetween when the device is assembled.

Each of the filtering units A, B and C comprises a drum of heavy gauge metal mesh 7 held to circular shape by means of metal straps 8 welded or otherwise firmly secured or attached to the top and bottom edges thereof, said straps 8 serving to render the units rigid and to provide support for the units themselves. Each of the filtering units B and C is open at both ends, while the outer unit A is open only at the top, the bottom of unit A being closed by a circular plate 9 welded or otherwise secured to the lower circular strap 8 as shown in Figs. 3 and 5. The inner filters B and C have their lower ends resting or seating upon the plate 9 so as to separate the chambers between adjacent units.

The filtering units A, B and C are supported in the upper portion of the metallic tank 1 as follows: At suitable intervals metal lugs or braces 50, Fig. 3, are welded or otherwise firmly attached to the inner surface of tank 1. These lugs or braces are all in the same plane and extend inwardly toward the center of tank 1. They may be placed as shown in Fig. 5A at such height above the closed end 1b of tank 1 as to cause the upper portion of upper metal strap 8 of filter unit A to extend approximately one inch above the top rim of tank 1 when the several filter units are assembled for operation therein. The space thus provided permits air to enter the device during the filtering process, thereby enabling the pumps hereinafter referred to to operate more efficiently. A circular metal band, ring or hoop 51, Fig. 3 rests by its own weight on the upper surface of the lugs or braces 50 hereinafter referred to and serves as a cushion between the undersurface of the closed end of filter unit A and the lugs or braces 50 themselves, thereby lessening the possibility of damage to the filtering units A, B and C, both during the operation of the device or during any transportation thereof. The diameter of said metal band, ring or hoop 51 is such as to permit it to rest readily upon the upper surface of said lugs or braces 50 but is not in excess of the diameter of the closed end of filter unit A.

The upper strap 8 of the outer unit A is provided with upstanding lugs 10 (Fig. 6) welded or otherwise secured thereto, the same being threaded on their upper ends which project above the tops of the upper strap 8 of the outer unit A and are adapted to be passed through holes in cover plate 4 and gasket 5 which may rest on upper strap 8 (Fig. 5) of outer unit A, and are provided with nuts 11 thereon so that cover plate 4 may be removably attached to the upper strap 8 of outer unit A. Said cover plate 4 is circular in shape and has a diameter of approximately one inch larger than the diameter of tank 1. The primary purpose of cover plate 4 is to prevent dirt and other organic substances from dropping into the device or the liquid being filtered. If the cover plate 4 fitted tightly or was sealed to the flange 1a of the tank 1, the pumps would not operate efficiently once the air in the tank was exhausted. The main purpose of cover 4 is to prevent foreign matter from accidently dropping into the tank 1 or into the liquid being filtered.

Alternatively diametrically opposed rods, which have their lower ends threaded to receive units 14 and 15 respectively, engage opposite faces of bottom plate 9 of the filter unit as shown in Fig. 3. Said rods 13 pass upwardly through guide sleeves 16 (Fig. 3) which are attached to the underside of cover plate 4 and thence through cover plate 4. Said rods are threaded at their upper ends to receive nuts 17. In this manner rods 13, when assembled with their nuts 14, 15 and 17 as shown in Fig. 3, extend through the cover plate 4 and the bottom plate 9 of the filtering unit and serve to maintain the bottom plate 9 in position as well as to give added rigidity to the plate on which filter units B and C rest. The principal function of guide sleeves 16 is to render it easy to replace cover 4 in proper position after cover 4 has been removed for any purpose.

The inner surface of each of the multiple filtering units A, B and C is completely covered by several thicknesses of filter paper 18 which may be of commercial type available on the open market, the filter paper 18 covering the inner vertical surfaces of the units A, B and C and being removably held in position by means of flexible metal substantially semicircular springs 19 at the top and bottom thereof as shown in Fig. 5 to bind the top and bottom edges of the filter papers 18 against the straps 8 at the top and bottom edges of the mesh 7 at the outer surface of the units A, B and C.

In event the liquid to be filtered contains moisture which should be extracted from the liquid before filtering, I provide a heating unit mounted on the outer side of the tank 1, which unit may consist of two Calrod heating elements each carrying 220 volts, the heating unit being enclosed in a steel jacket 20. The temperature generated by the heating elements is controlled by a conventional type thermostat 21 likewise attached to the tank 1, the thermostat being controlled by lead 22 extending from a starting contactor 23 also mounted on the outer side of tank 1. The heating unit 20 is controlled through leads 24 extending from a heater contactor 25 mounted on the outer side of the tank 1.

A flexible liquid intake tube 26 leads from a container not shown holding the liquid to be filtered, which passes the liquid to be filtered through a valve 27 (Fig. 9) to a primary pump 28, which passes the liquid through a valve 29 to the bottom of the heater unit 20 from the upper end of which the heated oil passes through a flexible hose 30 into a vertical pipe 31 disposed at the center of cover plate 4, the pipe 31 passing downwardly through the cover plate 4 and being welded as at 32 to the cover, the pipe terminating somewhat above the bottom plate 9 of the outer filter unit A, as shown in Fig. 3.

The portion of pipe 31 below cover plate 4 is perforated as at 33 (Fig. 7) to permit steady flow of the liquid which is to be filtered and which is forced by the primary pump 28 (Fig. 9) into the center of the inner filter unit C. The pressure required to pass the oil from the container through the flexible hose 30—31, the heating unit 20, and intake pipe 26 being supplied by the standard pump 28 (Fig. 9) operated by electricity or any other convenient source of power.

As the inner filtering unit C begins to fill under the force of primary pump 28, the filter paper lining 18 of unit C becomes saturated with the liquid and permits the liquid to pass under pressure through the filter paper 18 of the innermost unit C into the second filter space formed between the filter units B and C where the liquid falls by its own weight. As the process continues the liquid passes through the second filtering unit B into the third or outermost filter space formed between units B and A, and from that point passes through the unit A into the open area beside the outside wall of unit A and the inside surface of the tank 1, and by gravity the filtered liquid drops into the lower portion of tank 1 which serves as a temporary reservoir for the filtered liquid.

The tank outlet 3, which may comprise in part a flexible hose, leads from the bottom of tank 1 back to the original container, the filtered liquid being pumped under pressure supplied by a second conventional pump 40 operated by a motor 42 or other convenient means through a valve 41 back to the original fluid container. The entire filtering process may be repeated without interruption until the liquid has been thoroughly cleansed.

Fig. 9 shows the flow diagram for the filter, while Fig. 8 shows a convenient wiring diagram for the electrical circuit of the filter.

I do not limit my invention to the exact form shown in the drawings, for obviously changes may be made therein within the scope of the claims.

I claim:

1. A multi-stage gravity filter comprising a tank open at the top and closed at the bottom; a removable cover for said open top; a filtered liquid outlet at the bottom of said tank; an outermost filter unit having an open top disposed in the upper portion of the tank removably suspended from said cover and spaced from the wall of said tank, said unit having an imperforate bottom plate, the sides of said unit comprising open mesh metal with layers of filter paper disposed across said mesh and removably clamped thereto; other nested inner filter units each open at the top disposed within and spaced from each other and from the first filter unit, said other units seating upon the said bottom plate, and each of said other units comprising open mesh metal side walls with layers of filter paper disposed across said mesh and removably clamped thereto; means for introducing liquid to be filtered under pressure into the center of the innermost unit; and means for removing the filtered liquid through the said outlet.

2. In a filter as set forth in claim 1, each unit comprising straps secured to the upper and lower edges of the mesh; and resilient springs at the tops and bottoms of the filter paper layers compressing said layers against said upper and lower straps.

3. In a filter as set forth in claim 1, each unit comprising straps secured to the upper and lower edges of the mesh; resilient springs at the tops and bottoms of the filter paper layers compressing said layers against said upper and lower straps; and said bottom plate being fixedly secured to the bottom straps of the outermost unit.

4. In a filter as set forth in claim 1, said unit comprising straps secured to the upper and lower edges of the mesh; resilient springs at the tops and bottoms of the filter paper layers compressing said layers against said upper and lower straps; said bottom plate being fixedly secured to the bottom straps of the outermost unit; upstanding lugs on the upper straps of the outermost unit passing upwardly through said cover plate; and means on said lugs engaging the top of said cover plate.

5. In a filter as set forth in claim 1, each unit comprising straps secured to the upper and lower edges of the mesh; resilient springs at the tops and bottoms of the filter paper layers compressing said layers against said upper and lower straps; said bottom plate being fixedly secured to the bottom straps of the outermost unit; a pair of rods having their lower ends anchored in said bottom plate, said rods having their upper ends passing through said cover plate and through guide sleeves on the underside of the cover plate; and means on the rods engaging the top of said cover plate.

6. In a filter as set forth in claim 1, said introducing means comprising a liquid inlet pipe disposed exteriorly of said tank; a primary pump disposed in said inlet pipe; means for actuating said pump; a vertical pipe extending downwardly through said cover plate adjacent the center thereof, and terminating adjacent the bottom plate, said vertical pipe being fixedly secured to said cover plate and being perforated below the cover plate; and a flexible hose connecting said pipes.

7. In a filter as set forth in claim 1, said removing means comprising a pump in said liquid outlet, and means for actuating said pump.

8. A multi-stage gravity filter comprising a cylindrical tank open at the top and closed at the bottom; a removable circular cover for said open top; a filtered liquid outlet at the bottom of said tank; an outermost cylindrical filter unit having an open top disposed in the upper portion of the tank and spaced from the wall of said tank, said unit having an imperforate bottom plate, the sides of said unit comprising open mesh metal with layers of filter paper disposed across said mesh and removably clamped thereto; other nested cylindrical inner filter units each open at the top disposed within and spaced from each other and from the first filter unit, said other units seating upon the said bottom plate, and each of said other units comprising open mesh metal side walls with layers of filter paper disposed across said mesh and removably clamped thereto; means for introducing liquid to be filtered under pressure into the center of the innermost unit; means for heating the liquid to be filtered before introduction into the said unit, and means for removing the filtered liquid through the said outlet.

9. In a filter as set forth in claim 8, each unit comprising circular straps secured to the upper and lower edges of the mesh; and substantially semi-circular springs at the tops and bottoms of the filter paper layers compressing said layers against said upper and lower straps.

10. In a filter as set forth in claim 8, each unit comprising circular straps secured to the upper and lower edges of the mesh; substantially semi-circular springs at the tops and bottoms of the filter paper layers compressing said layers against said upper and lower straps; and said bottom plate being welded to the bottom straps of the outermost unit.

11. In a filter as set forth in claim 8, said unit comprising circular straps secured to the upper and lower edges of the mesh; and substantially semi-circular springs at the tops and bottoms of the filter paper layers compressing said layers against said upper and lower straps; and said bottom plate being welded to the bottom straps of the outermost unit; upstanding threaded lugs on the upper straps of the outermost unit passing upwardly through said cover plate; and nuts on said lugs engaging the top of said cover plate.

12. In a filter as set forth in claim 8, each unit comprising circular straps secured to the upper and lower edges of the mesh; and substantially semi-circular springs at the tops and bottoms of the filter paper layers compressing said layers against said upper and lower straps; said bottom plates being welded to the bottom straps of the outermost unit; a pair of rods having their lower ends anchored in said bottom plate, said rods having threaded upper ends passing through guide sleeves on the underside of the cover plate and passing through the cover plate; and nuts on the rods engaging the top of said cover plate.

13. In a filter as set forth in claim 8, said introducing means comprising a liquid inlet pipe disposed exteriorly of said tank; a primary pump disposed in said inlet pipe; means for actuating said pump; a vertical pipe extending downwardly through said cover plate adjacent the center thereof, and terminating adjacent the bottom plate, said vertical pipe being welded to said cover plate and being perforated below the cover plate; and a flexible hose connecting said pipes.

14. In a filter as set forth in claim 8, said introducing means comprising a liquid inlet pipe disposed exteriorly of said tank; a primary pump disposed in said inlet pipe; means for actuating said pump; a vertical pipe extending downwardly through said cover plate adjacent the center thereof, and terminating adjacent the bottom plate, said vertical pipe being welded to said cover plate and being perforated below the cover plate, a flexible hose connecting said pipes; said heating means comprising an electrically operated heating unit disposed in said inlet pipe in advance of the flexible hose; and thermostat means for controlling said heating unit.

15. In a filter as set forth in claim 8, said removing means comprising a pump in said liquid outlet, and means for actuating said pump.

References Cited in the file of this patent

UNITED STATES PATENTS

| | | |
|---|---|---|
| 1,140,726 | Warden | May 25, 1915 |
| 2,685,347 | Busby | Aug. 3, 1954 |